(12) United States Patent
Meguerditchian

(10) Patent No.: US 7,613,107 B2
(45) Date of Patent: Nov. 3, 2009

(54) PROTECTION SWITCH LOGGING METHODS AND SYSTEMS

(75) Inventor: Francois Meguerditchian, Gatineau (CA)

(73) Assignee: Alcatel Lucent, Paris (FR)

( * ) Notice: Subject to any disclaimer, the term of this patent is extended or adjusted under 35 U.S.C. 154(b) by 771 days.

(21) Appl. No.: 10/979,593

(22) Filed: Nov. 2, 2004

(65) Prior Publication Data

US 2006/0164996 A1    Jul. 27, 2006

(51) Int. Cl.
H04L 12/26 (2006.01)
(52) U.S. Cl. .................... 370/219; 370/220
(58) Field of Classification Search ............ 370/217, 370/218, 219, 220, 252
See application file for complete search history.

(56) References Cited

U.S. PATENT DOCUMENTS

| 2003/0112746 A1 | 6/2003 | Schaller et al. |
| 2005/0259571 A1* | 11/2005 | Battou .................... 370/217 |

FOREIGN PATENT DOCUMENTS

EP    1 172 968 A1    1/2002

OTHER PUBLICATIONS

"Telecommunications Management Network (TMN)" ETSI Standards, European Telecommunications Standards Institute, Sophia-Antipo, FR, vol. TMN No. V131, Nov. 2000, Chapters 4, 5.1, 6.2, 7.1, 7.3, 9.1.1.

"Information technology—Open Systems Interconnection—Structure of management information: Definition of management information", ITU-T Standard in Force (I), International Telecommunication Union, Geneva, CH, No. X721 2/92, Feb. 10, 1992, chapters 6.1, 6.5 to 6.7, 8.6 and 13.4.

"Network Aspects (NA)", ETSI Standards, European Telecommunications Standards Institute, Sophia-Antipo, FR, vol. NA-4, No. V111, Jan. 1998, Chapters 4.4.1.1 to 4.4.1.3, 4.4.2.2, 4.5.1.1.1, 4.5.1.1.5, 4.5.1.1.6, 4.5.1.3.1 and 4.5.2.2.3.

"Information technology—Open Systems Interconnection—Systems Management: Alarm reporting function", ITU-T Standard in Force (I), International Telecommunication Union, Geneva, CH, No. X733 2/92, Feb. 10, 1992, chapters 8.1, 8.1.1, 8.1.2.1, 8.1.2.2, 8.1.2.4 to 8.1.2.6, 8.1.2.9, 8.1.2.12.

(Continued)

*Primary Examiner*—Melvin Marcelo
(74) *Attorney, Agent, or Firm*—Smart & Biggar

(57) ABSTRACT

Methods and systems of logging detected protection system related events affecting a protection system are disclosed. A determination is made as to whether a detected event itself or in combination with a previous detected event provides information relating to both a protection switching operation and a cause of the protection switching operation, and if so, a further determination is made as to whether the information relating to a protection switching operation indicates that the protection switching operation has occurred. If both of these conditions are satisfied, a log entry associated with the protection switching operation, or possibly an alarm for the protection switching operation, is recorded in an event log. In one embodiment, an event log entry is created for a detected protection switching operation and then updated to include information related to a subsequently detected event associated with the protection switching operation.

37 Claims, 5 Drawing Sheets

OTHER PUBLICATIONS

"Information technology—Open Systems Interconnection—Systems Management: Log control function", ITU-T Standard in Force (I), International Telecommuniction Union, Geneva, CH, No. X735 9/92, Sep. 10, 1992, the whole document.

"Telecommunications Management Network (TMN)" ETSI Standards, European Telecommunications Standards Institute, Sophia-Antipo, FR, vol. TMN No. V131, Nov. 2000, Chapters 4, 5.1, 6.2, 6.4, 7.1, 7.3, 9.1.1.

* cited by examiner

PROTECTION SWITCH LOGGING METHODS AND SYSTEMS

FIELD OF THE INVENTION

This invention relates generally to protection switching in communication equipment and, in particular, to logging events associated with protection switching operations.

BACKGROUND

In high-availability routing switch platforms, a protection system must be able to detect switching errors and perform a switchover to a redundant component, a redundant switch fabric for instance. One widely used specification requires that a switchover occur within 60 ms, including 10 ms for detection and 50 ms to accomplish the actual switchover. In order to meet these requirements, the detection and switching functions are often hardware-driven for certain types of faults and when both redundant components are "healthy".

The health of switch fabrics in communication equipment may be assessed by a software-driven demerit system, such as described in U.S. patent application Ser. No. 09/963,520, published on Jun. 19, 2003 as Publication No. 2003/0112746, entitled "SYSTEM AND METHOD FOR PROVIDING DETECTION OF FAULTS AND SWITCHING OF FABRICS IN A REDUNDANT-ARCHITECTURE COMMUNICATION SYSTEM", and incorporated in its entirety herein by reference. This earlier application describes an error analysis and correlation (EAC) system which manages the demerit system. For fault and fabric health conditions not covered by hardware-driven functions, a fabric redundancy system (FRED) initiates fabric switchovers based on input from the error detection sub-systems such as FabMon and EAC.

Since fabric switchovers, and generally other protection switching operations in communication equipment, can be initiated by user-driven, hardware-driven and software-driven functions, it can be difficult for an operator to determine the cause of a switchover when multiple events that could have caused the switchover occur closely in time. For example, because a hardware-driven switchover occurs so quickly, events which are not reported until after the switchover has occurred must be considered in determining the cause. Also, because of the many factors that affect the health of a switch fabric or other components in a protection system, a seemingly harmless operator action could affect the health of an active fabric or components and result in a software-driven switchover.

Typically, alarms are raised by a protection system when a protection switching operation has occurred. These alarms alert an operator to the protection switching operation and provide an indication of the effect of the protection switching operation (i.e., that a particular switch fabric is now active), a time at which the protection switching operation occurred, and sometimes a general cause of the protection switching operation (i.e., whether the protection switching operation was user-, hardware- or software-driven).

Alarms generally do not provide sufficient information to allow an operator to accurately determine the reason for or the conditions which led to a protection switching operation. Although further information might be available through a maintenance interface to the protection system or communication equipment in which the protection system is implemented, this further information is normally updated, and thus lost, as the state of redundant components in the protection system changes. These difficulties in determining the cause of protection switchovers often necessitates the involvement of design personnel for product support.

Simply adding more alarms to detail protection switchovers would not necessarily overcome the above challenges. Due to the real time nature of alarm reporting and switchovers, for example, all of the information about a switchover might not be available at the time of the switchover.

SUMMARY OF THE INVENTION

In view of the foregoing, there is a need for methods and systems which would enable operators to more easily determine the cause of protection switchovers to thereby reduce the number of designer-level support issues.

Techniques for analyzing the occurrence of events and associating events with alarms for protection switching operations may assist in determining the cause of protection switching operations such as fabric switchovers.

According to an embodiment of the invention, a log of protection switching operations, illustratively the last 10 operations, is provided along with details about the time, exact reason, not just user-, hardware-, or software-driven as in the case of alarms, and a precise location of a fault or event that caused each protection switching operation.

According to one aspect of the invention, a method of logging detected protection system related events which affect a protection system in communication equipment is provided. The method includes determining whether a detected event itself or in combination with a previous detected event provides information relating to a protection switching operation and a cause of the protection switching operation, and if so, determining whether the information relating to a protection switching operation indicates that the protection switching operation has occurred. A log entry associated with the protection switching operation including at least a portion if the information relating to the cause of the protection switching operation is recorded in an event log of the detected event itself or in combination with a previous detected event provides information relating to a protection switching operation and a cause of the protection switching operation and the information relating to the protection switching operation indicates that a protection switching operation has occurred.

An event logging system is also provided, and includes an input for receiving an indication that an event has been detected, and an event logger coupled to the input. The event logger is configured to determine whether a detected event itself or in combination with a previous detected event provides information relating to a protection switching operation and a cause of the protection switching operation, and if so, to determine whether the information relating to a protection switching operation indicates that the protection switching operation has occurred. The event logger also records in an event log a log entry associated with the protection switching operation including at least a portion of the information relating to the cause of the protection switching operation where the detected event itself or in combination with a previous detected event provides information relating to a protection switching operation and a cause of the protection switching operation and the information relating to the protection switching operation indicates that a protection switching operation has occurred.

There is also provided, in accordance with another aspect of the invention, a method of logging detected events which affect a protection system in communication equipment which includes operations of recording in an event log a log entry associated with a protection switching operation, determining whether a detected event is associated with the protection switching operation, and updating the log entry to include information related to the detected event where the detected event is associated with the protection switching operation.

A related event logging system includes an input for receiving indications that protection switching operations and events have been detected and an event logger coupled to the input. The event logger records in an event log a log entry associated with a detected protection switching operation, determines whether a detected event is associated with the detected protection switching operation, and updates the log entry to include information related to the detected event where the detected event is associated with the detected protection switching operation.

A still further aspect of the invention provides a machine-readable medium storing a data structure which includes an event log storing an event log entry for an event which affected a protection system in communication equipment. The event log entry includes information associated with the protection switching operation to thereby associate the event log entry and the protection switching operation.

Other aspects and features of embodiments of the present invention will become apparent to those ordinarily skilled in the art upon review of the following description of specific illustrative embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
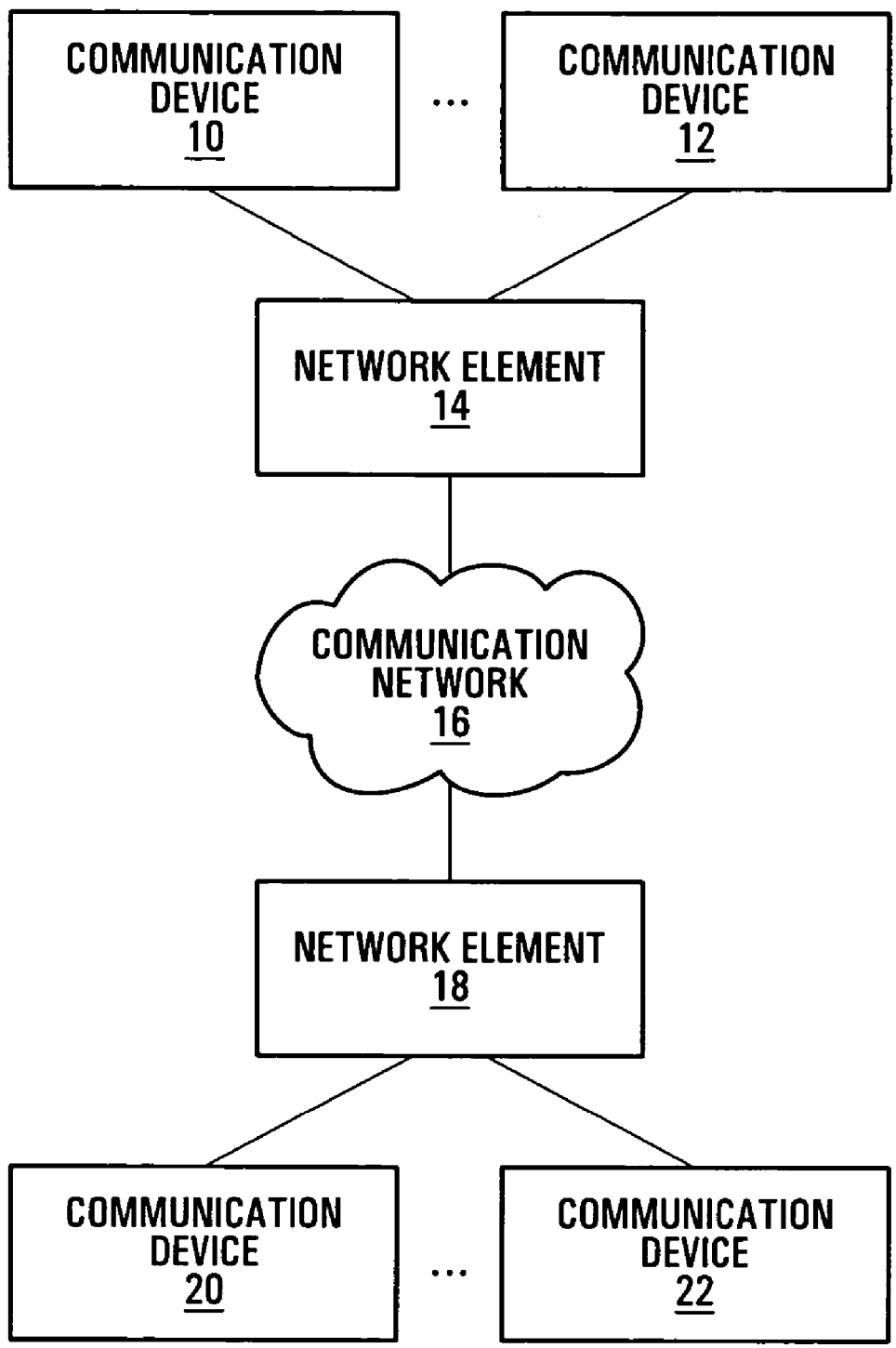
FIG. 1 is a block diagram of a communication system in which embodiments of the invention may be implemented.

FIG. 1 is a block diagram of a communication system in which embodiments of the invention may be implemented. The communication system in FIG. 1 includes communication devices, four of which are shown at 10, 12, 20, 22, and network elements 14, 18 of a communication network 16. The network elements 14, 18 are connected to the communication devices 10, 12 and 20, 22, respectively.

Although many communication devices 10, 12, 20, 22 and network elements 14, 18 may be connected to the communication network 16 or possibly through multiple communication networks, only representative examples of each of these components have been shown in FIG. 1 to avoid congestion. It should therefore be appreciated that the system of FIG. 1, as well as the contents of the other drawings, are intended solely for illustrative purposes, and that the present invention is in no way limited to the particular example embodiments as explicitly shown in the drawings and described herein. Embodiments of the invention may be implemented with further or fewer components which are interconnected in a different manner or with further or fewer operations which are performed in a different order than described.

The communication devices 10, 12, 20, 22 are electronic devices which include a receiver, a transmitter, or both to enable communications through the communication network 16. Many different types of communication device, including wired and wireless devices, will be apparent to those skilled in the art. The specific structure of the communication devices 10, 12, 20, 22 is dependent upon any communication media and protocols with which they are intended to operate. Although labelled similarly in FIG. 1, the communication devices 10, 12, 20, 22 need not be the same type of communication device.

The network elements 14, 18 represent components which operate within or in conjunction with the communication network 16, and may include, for example, access devices which provide the communication devices 10, 12 and 20, 22 with access to the communication network 16, or intermediate switches or routers which route communication traffic. In the communication system of FIG. 1, the communication devices 10, 12 and 20, 22 communicate with each other and possibly other systems or devices through the communication network 16 and the network elements 14, 18.

Those skilled in the art will be familiar with many different types of communication devices, network elements, and communication networks and their operation. In general, communication traffic is routed between transmitters and receivers. Embodiments of the present invention are substantially independent of communication traffic formats, routing mechanisms, and other characteristics which vary between different types of communication system.

Figure 2:
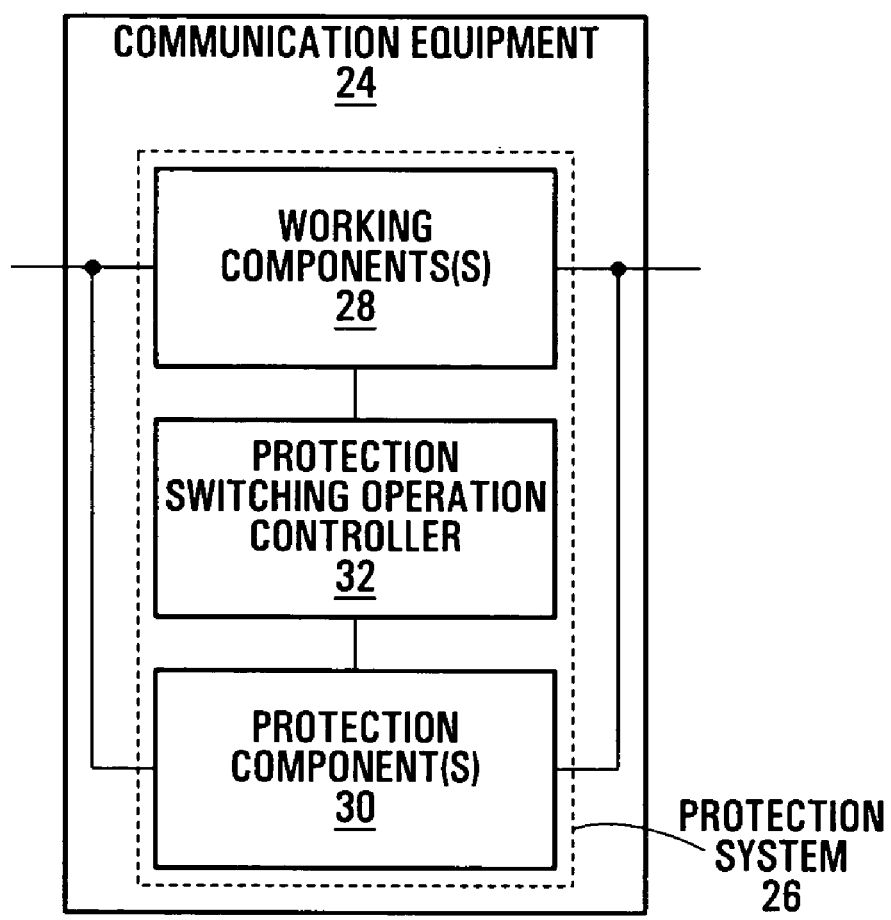
FIG. 2 is a block diagram of a protection system in communication equipment.

FIG. 2 is a block diagram of a protection system 26 in communication equipment 24. The communication devices 10, 12, 20, 22 and the network elements 14, 18 of FIG. 1 are examples of communication equipment 24. Although the techniques disclosed herein may be implemented at end user communication devices, protection systems tend to be implemented at upstream communication equipment such as the network elements 14, 18.

The protection system 26 is a redundant protection system which includes working components 28, which are protected by one or more protection components 30, and a protection switching operation controller 32. The working and protection components 28, 30 are normally identical, but with only one set of components actively handling communication traffic at any time. A group of working and protection components such as 28, 30 is also often referred to as a protection group.

The protection switching operation controller 32 controls switching of activity between the working and protection components 28, 30, and may provide for both hardware-driven and software-driven protection switching, as described above.

In one embodiment, the working and protection components 28, 30 include redundant switching fabric, and the protection switching operation controller 32 controls switching of activity between the working and protection fabric. For example, the health of each fabric may be monitored substantially as described in the above-referenced co-pending application to determine whether a currently inactive fabric should be made active. Other factors, illustratively user inputs, clearing of lockout timers, and hardware faults, may also affect which fabric is active.

Although the protection system 26 as shown in FIG. 2 includes all of the components of the communication equipment 24, communication equipment may include more than one protection group controlled by the same protection switching operation controller, more than one protection system with respective protection switching controllers, and unprotected components. Redundancy protection event logging as disclosed herein may be enabled for any or all protection systems in a piece of communication equipment. In one particular architecture to which embodiments of the invention may be applied, working and protection switch fabrics interface with line cards through fabric interface cards (FICs), which may also be protected. The line cards provide interfaces to a communication medium. Events affecting any or all of the switch fabrics, the FICs, and the line cards may be logged as described in further detail below.

The protection switching operation controller 32, or some other component of the protection system 26 or the communication equipment 24, may raise an alarm for every protection switching operation. As described above, however, an alarm generally provides limited information, including an indication which of the working and protection components 28, 30 are active after, before, or both before and after the protection switching operation, a time of the protection switching operation, and a general cause of the protection switching operation as user-, hardware- or software-driven.

In accordance with an aspect of the invention, an event log is maintained. Using the event log, an operator can analyze the occurrence of events to determine the actual cause or causes of a protection switching operation. When a protection switching operation occurs, an event log is updated and may include such details as the time of occurrence of a protection switching operation, the exact reason for the protection switching operation, and the location or component at which a failure was detected, if applicable. Each event log entry is associated with and thus can be traced to a protection switching operation, and vice-versa. This aspect makes determining the cause of a protection switching operation much easier, to the point that an operator can make this determination. This is an important improvement because in the past, without an event log, finding the cause of a protection switching operation was sometimes raised to a high level support issue requiring design staff involvement with sometimes limited results.

According to embodiments of the invention, seemingly harmless operator actions are taken into account when maintaining event logs. For example, an operator might disable redundancy protection on a port or a card, which could then affect demerit counts for the redundancy plane and cause a protection switching operation.

Figure 3:
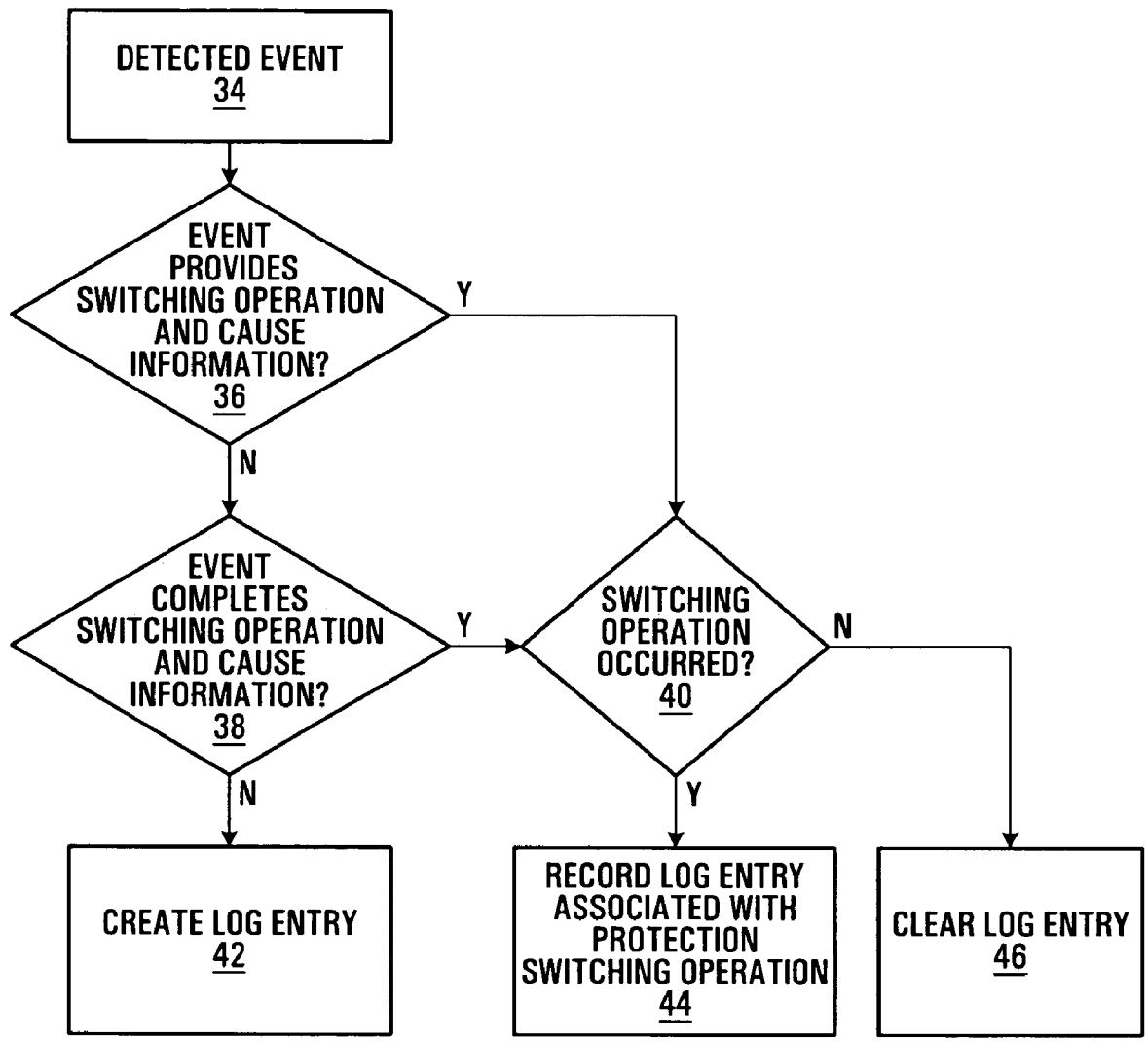
FIG. 3 is a flow diagram illustrating a method according to an embodiment of the invention.

FIG. 3 illustrates a method of logging events which affect a protection system in communication equipment according to an embodiment of the invention. Event logging may be performed in addition to or in lieu of generation of alarms for protection switching operations, so as to provide additional information relating to the cause of protection switching operations.

The method begins at 34 with detection of an event. This event may be detected by an event logging system or by another component or system, within a protection switching operation controller for instance. One example of an event is a user input event. A user of communication equipment, also referred to herein as an operator, may make selections or enter commands using a management or configuration interface, for example. User inputs may force particular working or protection components to become active or inactive or command an activity switch within a protection group. Configuration or management functions might also allow a user to enable or disable redundancy protection, such as on a per-port or FIC basis in the above example architecture.

Other events may originate within a protection system or communication equipment. In order to prevent repeated activity switching between working and protection components, for instance, lockout timers are often set when communication equipment is started and/or after each activity switch. Until lockout timers expire, also referred to as lockout clearing, at least some protection switching operations are disabled. Whereas some catastrophic failures on the active switching fabric might result in a protection switching operation while the system is in lockout mode, non-catastrophic failure protection switching operations are normally disabled during lockout. Thus, lockout clearing is another example of an event which may be logged, as fabric health is typically re-assessed on the clearing of the lockout condition.

Fault update events, which relate to hardware faults, may also be logged. This type of event may cause a hardware-driven protection switching operation or "FAST switch", and as a side effect of the protection switch, a FAST switch event is generated. However, generation and subsequent detection of other events may be implemented in software, which tends to be slower than hardware. Thus, fault update events might not be detected until after a FAST switch event has been detected. Embodiments of the invention provide a mechanism for logging events in association with protection switching operations, such as a fault update event, in association with a preceding protection switching operation, as discussed in further detail below.

Once an event has been detected at 34, the method proceeds at 36 with a determination of whether the detected event itself provides information relating to both a protection switching operation and its cause or possible cause. In the case of a user-initiated activity switch event, for example, the detected event itself provides all information about the protection switching operation, namely the activity switch, and its cause, specifically a user input. The determination at 36 may be based, for example, on a type of the detected event or whether information for any specific event log entry data fields, or possibly all event log entry data fields, described in further detail below, are provided.

It should be appreciated that information need not necessarily be explicitly provided by a detected event. References to information being provided in detected events are intended to indicate that information is either explicitly included, available, or otherwise derivable from a detected event, and should be interpreted accordingly. For instance, an event logging system might be notified of a detected event, and the notification may include information from which further information relating to a protection switching operation, a possible cause of a protection switching operation, or both, may be extracted or derived.

If the detected event provides protection switching and cause information, then at 40, a determination is made as to whether a protection switching operation actually occurred, or more generally whether the detected event is associated with a protection switching operation. This determination may be made at substantially the same time the event is detected or subsequent to event detection. In the case of a user force activity or force activity clear event, the cause and location associated with an event and its effect, namely a protection switching operation, are known, as described briefly above.

Information relating to a protection switching operation may indicate that a protection switching operation did or did not occur. If it is determined at 40 that a protection switching operation occurred, as in the case of any of the above user force events, an event log entry associated with the protection switching operation, or an alarm for the protection switching operation if one is generated, is recorded at 44 for the event. It should be appreciated that although shown as three separate operations 36, 40, and 44 in FIG. 3, these operations may effectively be reduced to a single operation of creating an event log entry when a user force event is detected. For a user force event, all cause and effect information which is relevant to a protection switching operation can be determined or inferred from the event itself.

The event log entry recorded at 44 preferably includes at least an event identifier indicating a type of the detected event and some sort of information associating the event log entry with the protection switching operation. Other information may also be included in an event log entry. An example of an event log entry is described in further detail below with reference to FIG. 7.

If a detected event provides both protection switching operation related information and cause information but did not result in a protection switching operation, which would be the case if the information relating to the protection switch operation indicates that a protection switching operation did not occur, then preferably no log entry is recorded at 44. In some embodiments, any log entry which may have been created for the event, or a previous event as described in further detail below, is deleted or cleared at 46.

Returning now to the determination at 36, a detected event might not provide protection switching operation and cause information. A location of a fault may be provided for a fault update event, for example, but whether the fault update event actually results in a protection switching operation might not be known. Similarly, in the special case of a FAST switch, the detected event may be the protection switching operation, and therefore the location of the event causing the FAST switch might not immediately be available.

In this type of situation, the method proceeds to 38, to determine whether the detected event, in combination with a previous detected event, completes protection switching operation and cause information. Thus, for a positive determination at 38, the two detected events together provide protection switching operation and cause information. The operation at 38 may be substantially similar to the operation at 36, except that both a current event and at least one previous event are considered at 38.

The processing at 38 may be best illustrated by considering several example scenarios. In the case of a first detected event, there is no previous event, and accordingly a negative determination is made at 38. A log entry is then created at 42. This log entry may be considered a partial or temporary log entry in that all of the information relating to a protection switching operation and its cause is not currently available. A log entry data structure may be only partially populated, for example.

In one embodiment, a log entry is created at 42 in a temporary or different event log than the event log in which the log entry is recorded at 44, although the same event log may instead include both complete log entries which are recorded at 44 and associated with protection switching operations and incomplete log entries created at 42 for which complete protection switching and cause information is not yet available.

For a hardware-driven FAST switch as the first detected event, for instance, information relating to the protection switching operation may be provided by the detected event before an event which actually caused the FAST switch is detected. Thus, the protection switching operation information may be known, and therefore an association between the log entry and the FAST switch may be established at 42. Even though the exact cause of the protection switching operation might not yet be known, a log entry associated with the protection switching operation may be created at 42.

Other types of detected events which are processed at 38 may similarly include information relating to either a protection switching operation or a possible cause of a protection switching operation. At least a portion of the partial information provided by such detected events is preferably stored in the log entry created at 42.

A second or subsequent detected event which also does not itself provide complete information in respect of a protection switching operation and its cause may, in combination with a previous detected event, provide complete information and thereby result in a positive determination at 38. The method then proceeds at 40 substantially as described above, to record a log entry associated with a protection switching operation at 44 or to clear a log entry at 46.

If multiple detected events provide complete information but did not result in a protection switch, then any log entries for the current and previous events which in combination provided complete information are preferably cleared at 46. This avoids retention of log entries for detected events which did not lead to a protection switching operation, thereby potentially reducing the size of the event log.

The operation of recording an event log entry which is associated with a protection switching operation at 44 may involve storing in the event log entry at least a portion of the information relating to the cause of the protection switching operation. This information may be provided by a currently detected event, in the case of a FAST switch for instance, or in the previous detected event, for other detected events which eventually cause or contribute to a protection switching operation. From an operational perspective, recording may involve creating a new log entry, moving a partial or temporary log entry from a temporary event log into an event log and populating additional data fields in the log entry, updating a log entry in the event log, or other mechanisms which will be apparent to those skilled in the art. The present invention is not limited to any particular log entry management technique.

Updating or supplementing of an event log entry at 44 may be suited to the situation of a detected FAST switch event followed by a detected fault update event. A log entry which is created at 42 for the FAST switch may be updated at 44 with a fault location, for example, when a fault update event is subsequently detected. Of course, it is possible that an event detected after a FAST switch might not be a fault update event, in which case the detected event is preferably processed substantially as described above.

Thus, event logging for a FAST switch may involve creating a log entry associated with the protection switching operation, and then updating the log entry to include information relating to a cause of the protection switching operation from a subsequently detected the event. On the other hand, if a next detected event is not associated with the FAST switch, a log entry for the detected event may be created at 42. Although not explicitly shown in FIG. 3, the log entry for the detected FAST switch may either be cleared or maintained in this situation. Maintaining the log entry for the FAST switch provides for possible updating of the log entry when another event is subsequently detected.

The FAST switch scenario described above is somewhat of a special case, in that a FAST switch is normally caused by a hardware fault. The association between other types of event and protection switching operations might not be quite as easily determined. Redundancy enabling and disabling events, lockout clearing events, and fault update events may affect a protection system and have an effect on the relative health of components in a protection group, but may or may not cause a protection switching operation. For instance, a protection switching controller may perform a protection group health or state analysis at predetermined intervals, illustratively after every detected event or after a certain number of events have been detected, and initiate a software-driven protection switching operation if a switching criterion is satisfied. One common protection switching criterion dictates that a protection switching operation is performed if an active component or set of components in a protection group is less healthy than an inactive component or set of components in the same protection group.

When the protection switching criterion is satisfied, any event which affected the state of the protection system may be determined to be associated with a resultant protection switching operation that will be or has been performed. For example, a protection switching controller may notify an event logging system whether a current state of the protection system satisfies a protection switching criterion. Thus, completion of a health or state analysis or a result thereof may be another type of event which is processed according to the method of FIG. 3. With reference again to FIG. 3, a detected health or state analysis event, in combination with one or more previous detected events which affected the health of the protection system, may result in a positive determination at 38. If the analysis results in a protection switching operation, then a log entry for each previous event may be recorded at 44.

If the state of the protection system does not satisfy the protection switching criterion, then no protection switch was caused by the event or events, and log entries for the analysis event and any previous health- or state-related events are preferably cleared at 46. As described briefly above, this operation clears log entries for events which did not result in or contribute to a protection switching operation. In this manner, only those events which are relevant to protection switching operations are added to or remain in the event log.

Several different mechanisms may be implemented for tracking the event or events for which event log entries are to be recorded at 44 or deleted at 46. In one possible scheme, log entries for events are created in a predetermined memory area or location at 42 and either stored in the event log at 44 or deleted at 46 during or after the next iteration of the software-driven protection switching operation decision process. Log entries created at 42 might instead be flagged as temporary or indeterminate and cleared or reclassified each time the software-driven protection switching operation decision process is executed. Other schemes may also be apparent to those skilled in the art.

In some embodiments, the recording operation at 44 involves establishing an association between an event log entry and a protection switching operation alarm. This may be accomplished, for example, by including common information, illustratively a time of occurrence of the protection switching operation, in both the event log entry and the alarm. The time, and possibly date, of occurrence of a protection switching operation may be determined or set by an event logging system when a positive determination is made at 40, for instance, or whenever information relating to a protection switching operation is provided by a detected event. In a more general sense, at least one of the event log entry and the alarm may include information associated with the other of the event log entry and the alarm. The event log entry could be updated to include a memory address, pointer, log index, or other identifier of an entry in an alarm log for instance. Thus, an association between an event log entry and an alarm may be inferred from common information in an event log entry and an alarm or explicitly indicated in one or both of the event log entry and the alarm.

As described above, the determinations at 38 and 40 for some types of event and protection switching operations may be based on a health or state analysis which involves determining a state of the protection system after an event and then determining whether the state of the protection system satisfies a protection switching criterion. In some embodiments, multiple events may be detected before the state of the protection system is determined. If the state of the protection system satisfies a protection switching criterion, then event log entries associated with an alarm for a protection switching operation performed responsive to the protection switching criterion may be recorded for each of the detected events.

According to an alternative scheme, one of the multiple events could be selected, with an event log entry associated with the protection switching operation being recorded only for the selected event. In this case, an indication of a degree of confidence that the selected event was actually the cause of the protection switching operation may be included in the event log entry.

For example, a particular fault in a protected component in a protection group may cause not only a FAST switch but also further faults at other components or locations. Thus, multiple fault update events may be detected for a single FAST switch event. According to the former logging scheme described above, event log entries are recorded for each of the detected fault update events and associated with the FAST switch. In the latter logging scheme, however, one of the faults for which a fault update event is detected is selected as being associated with the FAST switch and an event log entry is recorded only for the event log entry for the selected fault update event. The event log entry is preferably further updated to include an indication of a degree of confidence that the selected event was the primary cause of the FAST switch.

The selection of one of multiple detected events may be based on a time at which the events are detected, to select the first or most recently detected event for instance, a location of a fault for which a fault update event is detected, or both, for example. Other selection criteria may also be used.

One example of a confidence indication is a flag which is set in an event log entry when more than one detected event may be associated with a protection switching operation. This type of flag alerts an operator that more than one event may have contributed to a protection switching operation.

Of the above multiple-event logging techniques, the former technique may provide a more complete record of events which may have contributed to a protection switching operation, whereas the latter technique may reduce the size of an event log and the number of events to be reviewed when attempting to determine the cause of a protection switching operation.

In terms of implementing the operations described above, FIG. 4 is a block diagram of communication equipment which incorporates an event logging system in accordance with an embodiment of the invention. As shown, the communication equipment 44 includes a protection switching operation controller 54 which is connected to an event logging system 46, a memory 52, a protection system 56, and a user interface 58. The event logging system 46 includes an event logger 48 connected to the memory 52 and an event detector 50 connected to the protection switching operation controller 54. As described above with reference to FIG. 2, communication equipment 44 may include other components, including protected and/or unprotected components, in addition to those explicitly shown in FIG. 4.

Figure 4:
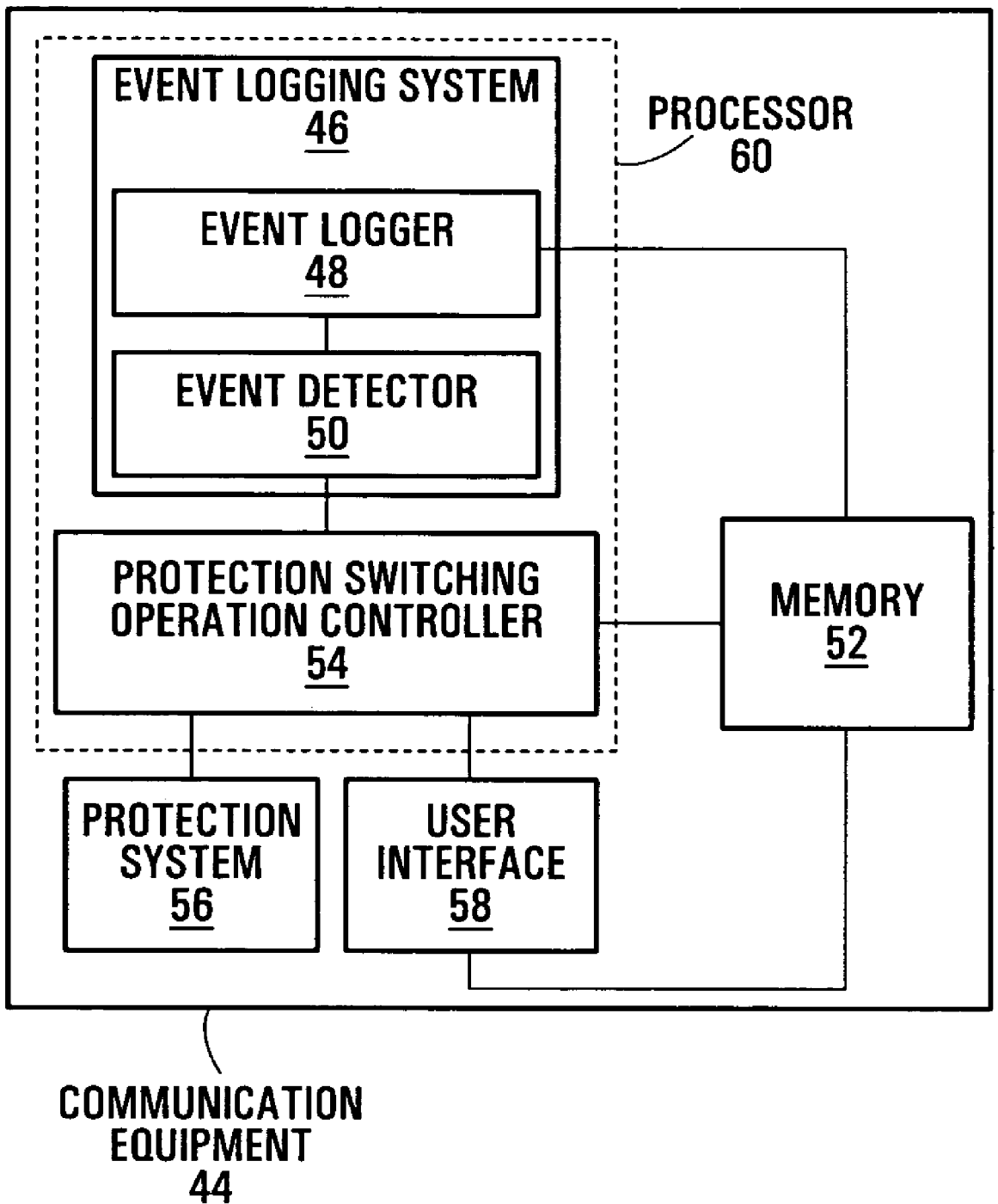
FIG. 4 is a block diagram of communication equipment which incorporates an event logging system in accordance with an embodiment of the invention.

As will be apparent to those skilled in the art, the protection switching operation controller 54 and the protection switching system 56 shown in FIG. 4 may be substantially similar to the protection system 26 shown in FIG. 2 and operate in a similar fashion. The protection switching operation controller 54 and the protection system 56 have been shown separately in FIG. 4 solely to illustrate that at least software-driven protection switching control may be implemented using a processor 60. The processor 60 may be a dedicated microprocessor, microcontroller, or ASIC, for example, which executes software stored in the memory 52 to perform protection switching control functions. In many implementations, however, the processor 60 may also perform other functions, including operating system functions, communication functions, and event logging functions under the control of software stored in the memory 52.

The event detector 50 detects events which affect the protection system 56. As described above, protection switching operations may also be detected and logged, for a FAST switch for instance. Thus, the event detector 50 may include both event detection and protection switching operation detection functions, or a separate protection switching operation detector may be provided.

Although the event detector 50 is shown within the event logging system 46 in FIG. 4, it should be appreciated that event detection may be handled by components or systems which are external to the event logging system 46. In some embodiments, events are detected by the protection switching operation controller 54, which provides on an input to the event logging system 46 an indication that an event has been detected. For example, the protection switching operation controller 54 may notify the event logging system 46 whenever it receives or detects an event in the protection system 56, illustratively a FAST switch or a fault update, or a user input from the user interface 58. The event detector 50 may instead actively detect events by monitoring or otherwise operating in conjunction with the protection system 56, the user interface 58, or both. A combined approach in which the event detector 50 relies on the protection switching operation controller 54 for detection of certain types of event and actively detects other types of event is also contemplated.

The event logger 48 records log entries for detected events according to the techniques disclosed herein. Like the event detector 50, the event logger 48 may rely on the protection switching operation controller 54 in performing certain functions. For example, the protection switching operation controller 54 may determine a state of the protection system 56 following an event or multiple events and notify the event logger 48 as to whether a protection switching criterion is satisfied. The event logger 48 may then proceed to record or clear event log entries.

According to the example embodiment shown in FIG. 4, both the event logger 48 and the event detector 50 are implemented using the processor 60, or more specifically as software stored in the memory 52 for execution by the processor 60. Although a single processor 60 is shown in FIG. 4, it should be appreciated that multiple processors, including dedicated, shared, or a combination of dedicated and shared processors, may be provided for event logging, protection switching control, and other functions of the communication equipment 44.

The memory 52 represents one or more memory devices which may include solid state memory devices, disk drives, and/or other types of memory device adapted for operation with fixed or removable storage media. Software for execution by the processor 60, as well as an alarm log in some embodiments and an event log, are stored in the memory 52, preferably in at least distinct memory locations or areas and possibly in different memory devices.

Interfaces which may be used to receive inputs from and/or provide outputs to a user or operator are represented by the user interface 58. The user interface 58 may include such devices as a keyboard, a mouse, a display, and a printer. Other types of interface, illustratively a transceiver, may also or instead be used to support user interaction with the communication equipment 44 from a remote location, through a network management system (NMS) for instance. Although a direct connection between the user interface 58 and the event logging system 46 has not been shown in FIG. 4 to avoid congestion in the drawing, it should be appreciated that a user may provide inputs to the event logging system 46, to control the "depth" or maximum number of log entries that may be recorded in an event log.

In operation, the event logger 48 determines whether a detected event itself or in combination with a previous detected event provides information relating to a protection switching operation and a possible cause thereof, and if so, records an event log entry associated with the protection switching operation. In some embodiments, the event log entry is associated with an alarm for the protection switching operation. Alarm generation would normally be handled by the protection switching operation controller 54, which preferably stores an alarm log entry or record for each alarm in the memory 52. When investigating a protection switching operation, an operator of the communication equipment 44 may access both an alarm log and an event log in the memory 52 through the user interface 58.

Further operations which may be performed by the event logging system 46 and other components of the communication equipment 44 will be apparent from the foregoing description of event logging methods.

Figure 5:
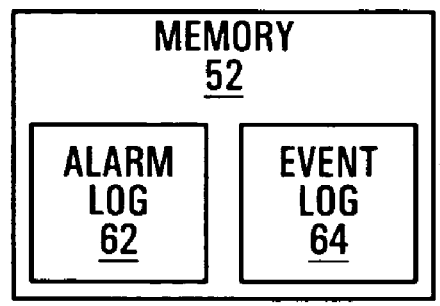
FIG. 5 is a block diagram of a data structure in a memory, according to a further embodiment of the invention.

FIG. 5 is a block diagram of a data structure which may be stored in the memory 52 according to a further embodiment of the invention. In the example embodiment shown in FIG. 5, the data structure includes an alarm log 62 and an event log 64, which may be stored in different memory locations, areas, or devices. In some embodiments, the memory 52 may also provide a further memory location, area, or device for storing temporary or partial log entries created at 42 (FIG. 3).

Figure 6:
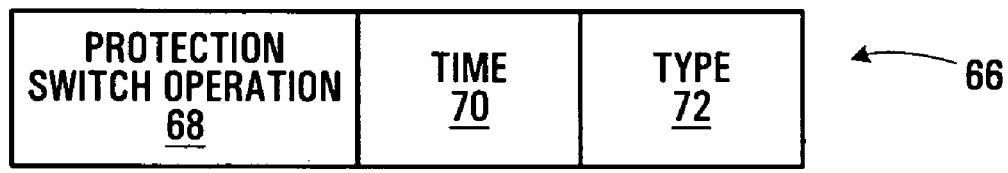
FIG. 6 is a block diagram of an illustrative example of an alarm log entry.

The alarm log 62 includes an alarm log entry for one or more protection switching operations which have been performed in a protection system. FIG. 6 is a block diagram of an illustrative example of an alarm log entry 66, which includes an indication of the protection switching operation at 68, in the form of an identifier of a currently active component or set of components for instance, a time of occurrence of the protection switching operation at 70, and a general type of the protection switching operation at 72. The alarm log entry 66 may thus be substantially similar to alarm logs generated by conventional protection systems.

Figure 7:
FIG. 7 is a block diagram of an illustrative example of an event log entry according to another embodiment of the invention.

The event log 64 stores event log entries for one or more events which affected the protection system. FIG. 7 is a block diagram of an illustrative example of an event log entry 74, which includes an identifier of the event at 76, such as a type of the event, a location affected by the event at 78 if applicable, a time of occurrence of an associated protection switching operation at 80, and a confidence indicator at 82. A fault update event is one type of event for which location information 78 may be available. Other information may also be provided in the event log entry 74, including a category which may indicate, for instance, whether a detected event relates to an ingress or egress data path, a shelf in communication equipment, switching fabric or a switching core, or on a card in the communication equipment.

In accordance with an embodiment of the present invention, at least one of an alarm log entry and an event log entry which are associated with the same protection switching operation includes information associated with the other of the alarm record and the event log entry to thereby associate the alarm log entry and the event log entry. This information is in the form of common information, namely a time of occurrence of a protection switching operation in the example log entries shown in FIGS. 6 and 7. If either or both of the logs 62, 64 are arranged or accessible by memory addresses, pointers, or indices, then an association between an alarm log entry and an event log entry may be established by including an address, pointer, or index of an entry in one of the logs in the associated entry stored in the other log.

At any time, the event log 64 may include log entries which are incomplete. For example, a FAST switch may have corresponding entries in the alarm log 62 and the event log 64 which include substantially the same time at 70 and 80, but the location 78 of the event log entry 74 might not have been available when the FAST switch was detected. Thus, the event log entry 74 may be updated with the location 78 when a fault update event is subsequently detected.

As described above, event logging in accordance with embodiments of the invention may be implemented in conjunction with protection systems which may or may not generate alarms. Thus, an event log entry may include information associated with a protection switching operation, illustratively a time of occurrence of the protection switching operation, which may or may not also be recorded in an alarm log.

Similarly, after a determination is made that a current state of the protection system satisfies a protection switching criterion, event log entries for any contributing events may be updated with a time of the resultant protection switching operation.

Event logging techniques in accordance with embodiments of the invention may provide improved system availability by facilitating identification and removal of root causes of protection switching operations, between redundant switching fabrics in communication equipment for instance.

System support may also be enhanced by logging events in association with protection alarms. An end user is provided with more detailed information, which will likely result in a better understanding of which actions or errors caused a specific protection switching operation. Support personnel can also benefit from this feature in that event logs indicate whether a protection switching operation may have been caused by something the end user did without realizing that it would affect the protection system or by a legitimate problem. When a protection switching operation is caused by a legitimate problem, appropriate actions may be more easily identified and performed to restore service.

What has been described is merely illustrative of the application of the principles of the invention. Other arrangements and methods can be implemented by those skilled in the art without departing from the scope of the present invention.

For example, although described primarily in the context of methods and systems, other implementations of the invention are also contemplated, as instructions stored on a machine-readable medium for example.

In addition, references to common information in the context of establishing associations between event log entries and alarm log entries should not be interpreted as precluding any discrepancy between the common information in alarm log entries and corresponding event log entries. Times of occurrence as recorded in an alarm log entry and an event log entry could differ by +1 second or some other interval, for instance.

Those skilled in the art will also appreciate that embodiments of the present invention may be applied to control path protection systems and other types of protection systems than data path protection systems as described above. Where control path redundancy is provided, an event log, and possibly also an alarm log, is stored in such a manner as to survive a protection switch between redundant control path components. This latter feature may be desirable regardless of whether event logging is implemented for a data path, a control path, or both.

I claim:

1. A machine-implemented method of logging detected protection system related events which affect a protection system in communication equipment, the method comprising:

determining whether a detected event itself or in combination with a previous detected event provides information relating to a protection switching operation and a cause of the protection switching operation;

determining whether the information relating to a protection switching operation indicates that the protection switching operation has occurred, where a detected event itself or in combination with a previous detected event provides information relating to a protection switching operation and a cause of the protection switching operation;

recording in an event log a log entry associated with the protection switching operation including at least a portion of the information relating to the cause of the protection switching operation where the detected event itself or in combination with a previous detected event provides information relating to a protection switching operation and a cause of the protection switching operation and the information relating to the protection switching operation indicates that a protection switching operation has occurred; and clearing a log entry for the previous detected event where the detected event in combination with the previous detected event provides information relating to a protection switching operation and a cause of the protection switching operation and the information relating to the protection switching operation indicates that a protection switching operation has not occurred.

2. The method of claim 1, wherein the log entry for the previous detected event is stored separately from the event log.

3. The method of claim 1, wherein recording comprises moving a log entry for the previous event into the event log where the detected event in combination with the previous detected event provides information relating to a protection switching operation and a cause of the protection switching operation and the information relating to the protection switching operation indicates that a protection switching operation has occurred.

4. The method of claim 1, wherein recording comprises including common information in an alarm for the protection switching operation and the log entry associated with the protection switching operation.

5. The method of claim 4, wherein the common information comprises a time of occurrence of the protection switching operation.

6. The method of claim 1, wherein recording comprises including in at least one of the log entry and an alarm for the protection switching operation information associated with the other of the log entry and the alarm.

7. The method of claim 1, wherein the information relating to a protection switching operation indicates whether a state of the protection system after the previous detected event satisfies a protection switching criterion, where a detected event in combination with a previous detected event provides information relating to a protection switching operation and a cause of the protection switching operation.

8. The method of claim 1, wherein:
determining whether a detected event in combination with a previous detected event provides information relating to a protection switching operation and a cause of the protection switching operation comprises determining whether a detected event in combination with a plurality of previous detected events provides information relating to a protection switching operation and causes of the protection switching operation;
the information relating to a protection switching operation indicates whether a state of the protection system after the plurality of previous detected events satisfies a protection switching criterion, where a detected event in combination with the plurality of previous detected events provides information relating to a protection switching operation and causes of the protection switching operation; and
recording comprises recording a respective plurality of log entries associated with the protection switching operation including at least a portion of the information relating to a cause of the protection switching operation for each of the plurality of previously detected events where the state of the protection system satisfies a protection switching criterion.

9. The method of claim 1, wherein the detected protection system related events comprise at least one of a user input, a protection switching operation, clearing of a lockout timer, and a protection system component fault update.

10. The method of claim 1, further comprising:
receiving a user input; and
setting a maximum number of log entries in the event log responsive to the user input.

11. The method of claim 1, wherein the protection system comprises redundant control plane components, and wherein the event log is stored in memory which survives a switch between the redundant control plane components.

12. A machine-readable medium storing instructions which when executed by a machine perform the method of claim 1.

13. The method of claim 1, further comprising:
creating a log entry for the detected event where the detected event itself or in combination with a previous detected event does not provide information relating to a protection switching operation and a cause of the protection switching operation.

14. The method of claim 13, wherein the log entry for the detected event is stored separately from the event log.

15. An event logging system for logging detected events which affect a protection system in communication equipment, the event logging system comprising:
an input for receiving an indication that an event has been detected; and
an event logger coupled to the input and configured to determine whether a detected event itself or in combination with a previous detected event provides information relating to a protection switching operation and a cause of the protection switching operation, to determine whether the information relating to a protection switching operation indicates that the protection switching operation has occurred, where a detected event itself or in combination with a previous detected event provides information relating to a protection switching operation and a cause of the protection switching operation, to record in an event log a log entry associated with the protection switching operation including at least a portion of the information relating to the cause of the protection switching operation where the detected event itself or in combination with a previous detected event provides information relating to a protection switching operation and a cause of the protection switching operation and the information relating to the protection switching operation indicates that a protection switching operation has occurred, and to clear a log entry for the previous detected event where the detected event in combination with the previous detected event provides information relating to a protection switching operation and a cause of the protection switching operation and the information relating to the protection switching operation indicates that a protection switching operation has not occurred.

16. The event logging system of claim 15, wherein the event logger is implemented in a processor.

17. The event logging system of claim 15, wherein recording comprises including common information in an alarm for the protection switching event and the log entry associated with the protection switching operation.

18. The event logging system of claim 15, wherein the protection switching system comprises:
a protection switching operation controller configured to determine a state of the protection system after the previous detected event, to determine whether the state of the protection system satisfies a protection switching criterion, and to provide the indication to the event logger, the indication comprising the information relating to a protection switching operation and indicating whether the state of the protection system satisfies a protection switching criterion, where a detected event in combination with a previous detected event provides information relating to a protection switching operation and a cause of the protection switching operation.

19. The event logging system of claim 18, wherein the protection switching operation controller is further configured to determine the state of the protection system after a plurality of previous detected events and to provide the indication to the event logger, the indication comprising the information relating to a protection switching operation and indicating whether the state of the protection system satisfies a protection switching criterion, and wherein the event logger is further configured to record a respective plurality of log entries associated with the protection switching operation including at least a portion of the information relating a cause of the protection switching operation for each of the plurality of events where the state of the protection system satisfies a protection switching criterion.

20. The event logging system of claim 15, further comprising:
an interface for providing access to the event log.

21. The event logging system of claim 15, further comprising:
a user interface for receiving input from a user,
wherein a maximum number of log entries in the event log is set responsive to an input received from the user.

22. The event logging system of claim 15, wherein the protection system comprises redundant control plane components, and wherein the event log is stored in memory which survives a switch between the redundant control plane components.

23. The event logging system of claim 15, wherein the protection system comprises a working switching fabric and at least one redundant protection switching fabric.

24. The event logging system of claim 15, implemented in a network element of a communication network.

25. A machine-implemented method of logging detected events which affect a protection system in communication equipment, the method comprising:

recording in an event log a log entry associated with a protection switching operation;

determining whether a detected event is associated with the protection switching operation;

updating the log entry to include information related to the detected event where the detected event is associated with the protection switching operation;

recording a log entry for the detected event in the event log where the detected event is not associated with the protection switching operation;

repeating the operations of determining and updating for a subsequent detected and where the subsequent detected event is not associated with the protection switching operation:

determining whether the subsequent detected event itself or in combination with the detected event provides information relating to a further protection switching operation and a cause of the further protection switching operation;

determining whether the information relating to a further protection switching operation indicates that the further protection switching operation has occurred, where the subsequent detected event itself or in combination with the detected event provides information relating to a further protection switching operation and a cause of the further protection switching operation;

recording in the event log a log entry associated with the further protection switching operation including at least a portion of the information relating to the cause of the further protection switching operation where the subsequent detected event itself or in combination with the detected event provides information relating to a further protection switching operation and a cause of the further protection switching operation and the information relating to the further protection switching operation indicates that a further protection switching operation has occurred; and clearing the log entry for the detected event where the subsequent detected event in combination with the detected event provides information relating to a further protection switching operation and a cause of the further protection switching operation and the information relating to the further protection switching operation indicates that a further protection switching operation has not occurred.

26. The method of claim 25, wherein determining whether the detected event is associated with the protection switching operation comprises determining whether the detected event is of a predetermined type associated with the protection switching operation.

27. The method of claim 26, wherein the protection switching operation comprises a hardware-initiated protection switching operation, and wherein the predetermined type of event is a hardware fault event.

28. The method of claim 25, wherein updating comprises moving the log entry to a second event log.

29. The method of claim 25, wherein updating comprises updating the log entry to include an indication of a degree of confidence that the event is associated with the protection switching operation.

30. The method of claim 25, wherein a plurality of events are detected, wherein determining whether the detected event is associated with the protection switching operation comprises determining that one of the plurality of events is associated with the protection switching operation, and wherein updating comprises updating the log entry to include information related to the one of the plurality of events and an indication of a degree of confidence that the one of the plurality of events is associated with the protection switching operation.

31. A machine-readable medium storing instructions which when executed by a machine perform the method of claim 25.

32. An event logging system for logging detected events which affect a protection system in communication equipment, the event logging system comprising:

an input for receiving indications that protection switching operations and events have been detected; and an event logger coupled to the input and configured to record in an event log a log entry associated with a detected protection switching operation, to determine whether a detected event is associated with the detected protection switching operation, to update the log entry to include information related to the detected event where the detected event is associated with the detected protection switching operation, to record a log entry for the detected event in the event log where the detected event is not associated with the protection switching operation; to determine whether a subsequent detected event is associated with the detected protection switching operation, to update the log entry to include information related to the subsequent detected event where the subsequent detected event is associated with the detected protection switching operation, and, where the subsequent detected event is not associated with the protection switching operation:

to determine whether the subsequent detected event itself or in combination with the detected event provides information relating to a further protection switching operation and a cause of the further protection switching operation;

to determine whether the information relating to a further protection switching operation indicates that the further protection switching operation has occurred, where the subsequent detected event itself or in combination with the detected event provides information relating to a further protection switching operation and a cause of the further protection switching operation;

to record in the event log a log entry associated with the further protection switching operation including at least a portion of the information relating to the cause of the further protection switching operation where the subsequent detected event itself or in combination with the detected event provides information relating to a further protection switching operation and a cause of the further protection switching operation and the information relating to the further protection switching operation indicates that a further protection switching operation has occurred; and to clear the log entry for the detected event where the subsequent detected event in combination with the detected event provides information relating to a further protection switching operation and a cause of the further protection switching operation and the information relating to the further protection switching operation indicates that a further protection switching operation has not occurred.

33. The event logging system of claim 32, wherein the event logger is implemented in a processor.

34. The event logging system of claim 32, further comprising:
   an event detector for detecting events; and
   a protection switching operation detector for detecting protection switching operations.

35. The event logging system of claim 32, wherein the event logger is configured to determine that the detected event is associated with the detected protection switching operation where the detected protection switching operation comprises a hardware-initiated protection switching operation and the detected event is a hardware fault event.

36. The event logging system of claim 32, wherein the event logger is configured to update the log entry by including in the log entry an indication of a degree of confidence that the detected event is associated with the detected protection switching operation.

37. The event logging system of claim 32, wherein the event logger is configured to determine that one of a plurality of detected events is associated with the detected protection switching operation, and to update the log entry to include information related to the one of the plurality of detected events and an indication of a degree of confidence that the one of the plurality of detected events is associated with the detected protection switching operation.

* * * * *

UNITED STATES PATENT AND TRADEMARK OFFICE
CERTIFICATE OF CORRECTION

PATENT NO.        : 7,613,107 B2                                        Page 1 of 1
APPLICATION NO.   : 10/979593
DATED             : November 3, 2009
INVENTOR(S)       : Francois Meguerditchian It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this

Nineteenth Day of October, 2010

David J. Kappos
*Director of the United States Patent and Trademark Office*